Figure 1:
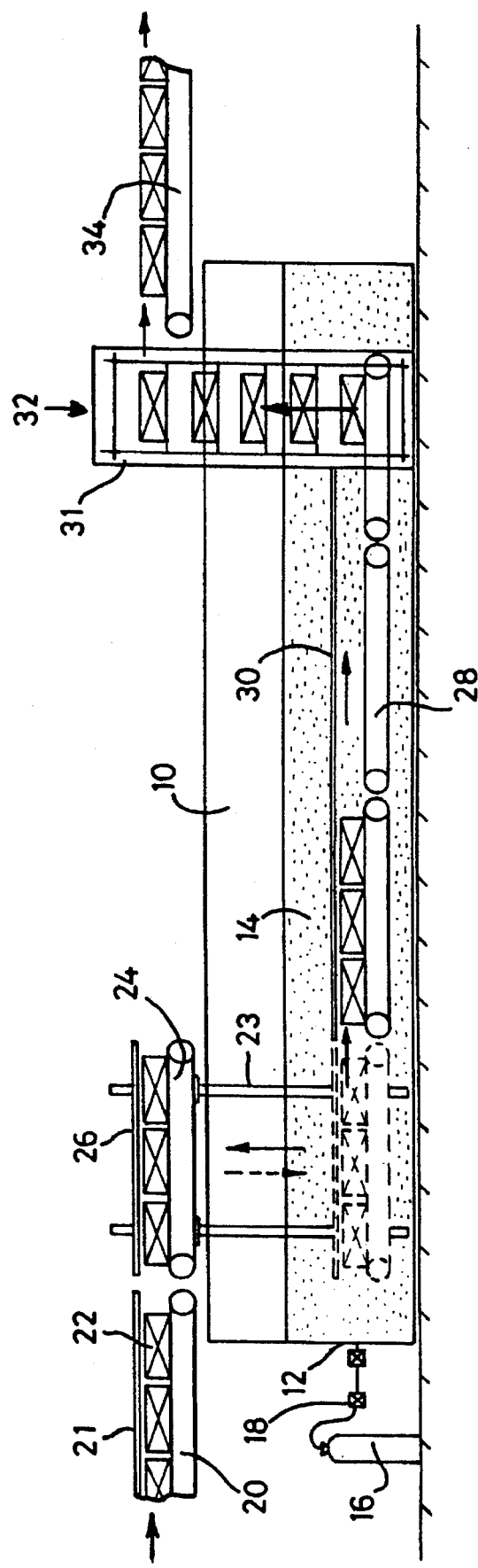

United States Patent [19]
Tyrrell et al.

[11] Patent Number: 5,487,699
[45] Date of Patent: Jan. 30, 1996

[54] TREATMENT OF POULTRY

[75] Inventors: Christopher M. Tyrrell, Bungay; David R. Wills, Roydon; David V. Gardiner, Starston; Barry W. Landymore, Brockdish, all of United Kingdom

[73] Assignee: Anglia Autoflow Limited, Diss, United Kingdom

[21] Appl. No.: 346,786

[22] Filed: Nov. 30, 1994

[30] Foreign Application Priority Data

Jan. 27, 1994 [GB] United Kingdom ............. 9401520

[51] Int. Cl.⁶ .................................................. A22B 3/00
[52] U.S. Cl. ........................................ 452/66; 452/53
[58] Field of Search ............................ 452/66, 57, 52, 452/53

[56] References Cited

U.S. PATENT DOCUMENTS

| | | | |
|---|---|---|---|
| 2,737,683 | 3/1956 | Regensburger | 452/66 |
| 3,828,396 | 8/1974 | Wernberg | 452/66 |
| 4,888,855 | 12/1989 | Haumann et al. | 452/66 |
| 5,152,714 | 10/1992 | Audsley et al. | 452/66 |
| 5,186,677 | 2/1993 | Christensen et al. | 452/66 |

FOREIGN PATENT DOCUMENTS 282535 12/1987 Japan ......................... 452/66

Primary Examiner—Willis Little
Attorney, Agent, or Firm—Lee, Mann, Smith, McWilliams, Sweeney & Ohlson

[57] ABSTRACT

Apparatus for gas stunning of poultry in open top drawers (22) comprises a tank (10) holding a heavier than air stunning gas such as a mixture argon and carbon dioxide. A lowering conveyor (24) receives the poultry-containing drawers (22), lowers them into the tank and delivers them to the infeed end of a series of conveyors (28) which transport the drawers (22) through the tank to the base of a lifting conveyor (32) which lifts the drawers and delivers them to the infeed end of a conveyor (34) which transports the dead poultry away for slaughtering. The conveyors (24, 28) are provided with covers (26, 30) to prevent the poultry escaping from the drawers. The drawers (22) are moulded with apertured sides and bases to allow penetration of the gas into the drawers so that the poultry is exposed to the gas for a time sufficient to kill the poultry, or at least render the poultry anoxic.

8 Claims, 6 Drawing Sheets

TREATMENT OF POULTRY

This invention relates to the treatment of poultry, and in particular to apparatus for and a method of gas stunning poultry. The term stunning is used herein to mean loss of mobility or motor function on the part of the poultry, e.g., resulting from anoxia, temporary loss of consciousness or death due to asphyxiation.

Poultry for slaughter are usually electrically stunned and then slaughtered by having their throats cut. In this process, operatives remove live birds from drawers or crates, shackle them by their legs and hang them upside down by their feet on hooks on a hanging line which conveys the birds to an electric stunning bath in which the head of each individual bird is immersed in brine and electric current passed through the bird by the shackle. This process has a number of disadvantages: when the birds are shackled, they struggle and beat their wings and carcass damage sometimes results; and electrical stunning causes convulsions which are thought to impair meat quality and delay portioning or de-boning. To overcome these problems, gas stunning of poultry has been proposed, e.g., in EP 0434278 and EP 0434279. However these prior proposals do not provide practical means and methods for exposing poultry to gas for stunning, and the present invention aims to remedy this deficiency.

According to its broadest aspect apparatus for gas stunning of poultry accommodated in open top containers comprises a chamber for accommodating a heavier than air gas or gases effective to stun the poultry, immersing means for lowering the containers into the chamber and subsequently lifting the containers out of the chamber after a period of time sufficient for the gas or gases to stun the poultry and covering means for covering the containers at least until the poultry are stunned.

The immersing means may be operative to lower the containers into the chamber, maintain the containers in their lowered position and then raise the containers out of the chamber, but this simple arrangement may have insufficient capacity to process birds at the required rate. The rate may be increased by having two (or more) sets of immersing means operative to immerse the poultry in the same chamber, one immersing means descending while another is rising, but the immersing means preferably comprise lowering means for lowering the containers into the chamber, conveying means for conveying the containers within the chamber and lifting means for lifting the containers out of the chamber.

Hence according to a more limited aspect of the invention appartaus for gas stunning of poultry accommodated in open-top containers comprises a chamber for accommodating a heavier than air gas or gases effective to stun the poultry, conveying means within the chamber for transporting the containers through the chamber, covering means above the conveying means to prevent escape of poultry from the containers as the latter are transported through the chamber on the conveying means, the covering means being of perforate, mesh or apertured construction to permit the passage of gas therethrough, lowering means for lowering the containers into the chamber and for delivering the containers to an infeed end of the conveying means, and lifting means for receiving the containers at the outfeed end of the conveying means and for lifting the containers out of the chamber.

The lowering means preferably comprise a generally horizontal platform, conveniently in the form of a conveyor, which receives containers from an infeed conveyor, lowers them into the chamber and then delivers them to the infeed end of the conveying means in the chamber before the platform, now empty, is raised to receive the next batch of poultry-containing containers. The lowering means preferably has a cover spaced above the platform to cover the tops of the containers which are on the platform.

The platform of the lowering means conveniently accommodates a plurality of open top containers, e.g., three, so that each descent of the platform lowers this plurality of containers into the chamber.

The lowering means may alternatively comprise an inclined conveyor, having an upper end receiving containers from the infeed conveyor and a lower end delivering containers to the conveying means.

The lifting means may be similar to the lowering means, comprising a generally horizontal platform in the form of a conveyor which reciprocates up and down, moving up to lift the poultry-containing containers to the infeed end of an outfeed conveyor and moving down when in an unloaded state to collect the next batch of poultry-containing containers. The platform of the lifting means preferably accommodates a plurality of containers but the lifting means does not necessarily need a cover to cover the containers because the poultry have been stunned by the gas at this stage.

Alternatively, the lifting means may comprise endless chains which are driven in continuous loops so that projections carried by the chains engage the containers and lift the containers to the level of the outfeed conveyor, a pusher mechanism pushing the raised containers from the lifting means onto the outfeed conveyor.

As an alternative to the use of a conveyor or endless chain, the lifting means may have a column provided, at each of a number of levels (e.g., four), with latches for supporting a container. A container is received at the lowest level and then pushed upwardly by a lifter to the next higher level where it is supported by the latches at that level. The subsequent container is received at the lowest level and the two containers are then lifted by one level where they are supported by the respective latches. This process continues until a container reaches the top level where it is unlatched and pushed horizontally onto the outfeed conveyor. Hence, in operation each level is occupied by a container, each container moving stepwise up the column from one level to the next higher level as the uppermost container is pushed out of the column and a new container is received at the lowest level. The latches may be gravity operated, being displaced by the upward movement of the container and then, once the container has reached the level, pivoting to a retaining position in which they support the container and prevent downward movement of the container.

According to another aspect of the invention a method of gas stunning poultry accommodated in open-top containers comprises lowering the containers into a chamber containing a stunning gas, and lifting the containers out of the chamber after a period of time sufficient for the gas to stun the poultry, the containers being covered at least until the poultry is stunned to prevent the escape of poultry from the containers whilst allowing the passage of gas into the containers. The method preferably includes conveying the containers through the chamber for a period of time sufficient for the gas to stun the poultry.

The stunning gas may be a single gas, such as argon, or may be a mixture of gases, e.g., argon and carbon dioxide. The method is preferably continuous, providing a regular supply of stunned poultry.

The poultry are preferably exposed to the gas for a time sufficient to kill them, although it is possible for the birds to be stunned to an extent that they are anoxic. This state of anoxia should prevail at least until the birds are hung on the hanging line, and preferably until they are slaughtered.

Figure 2:
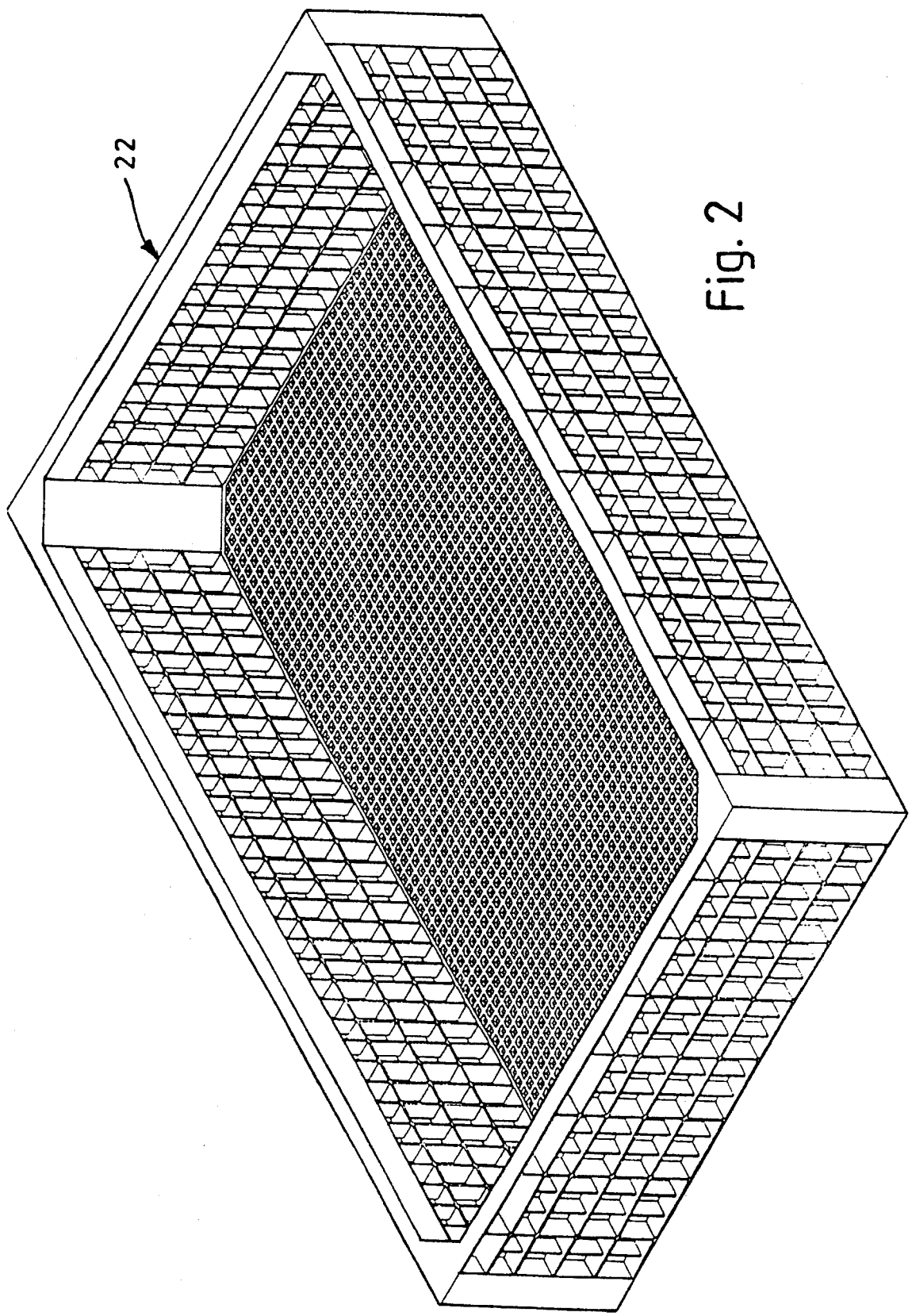
Figure 3:
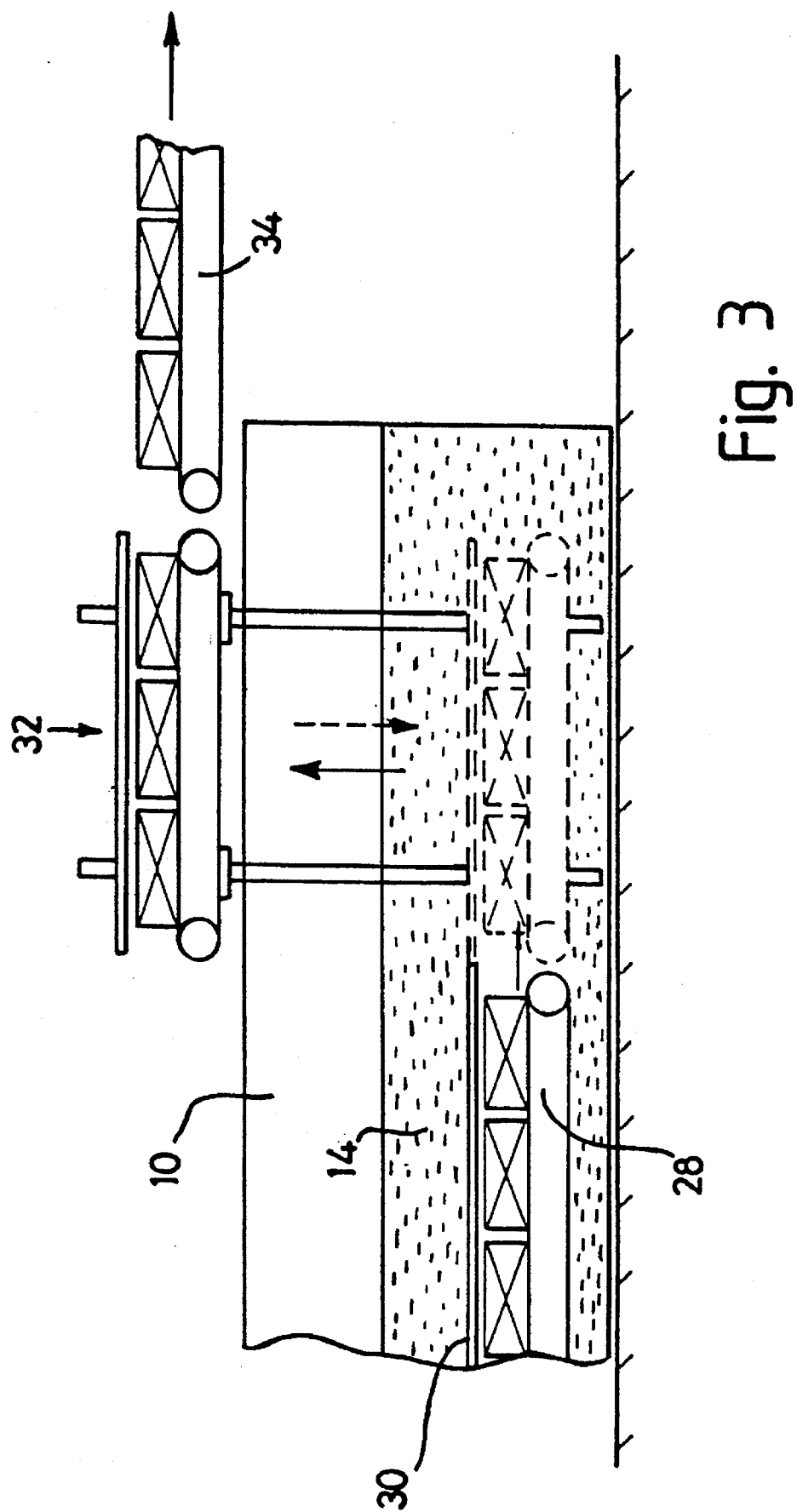
Figure 4:
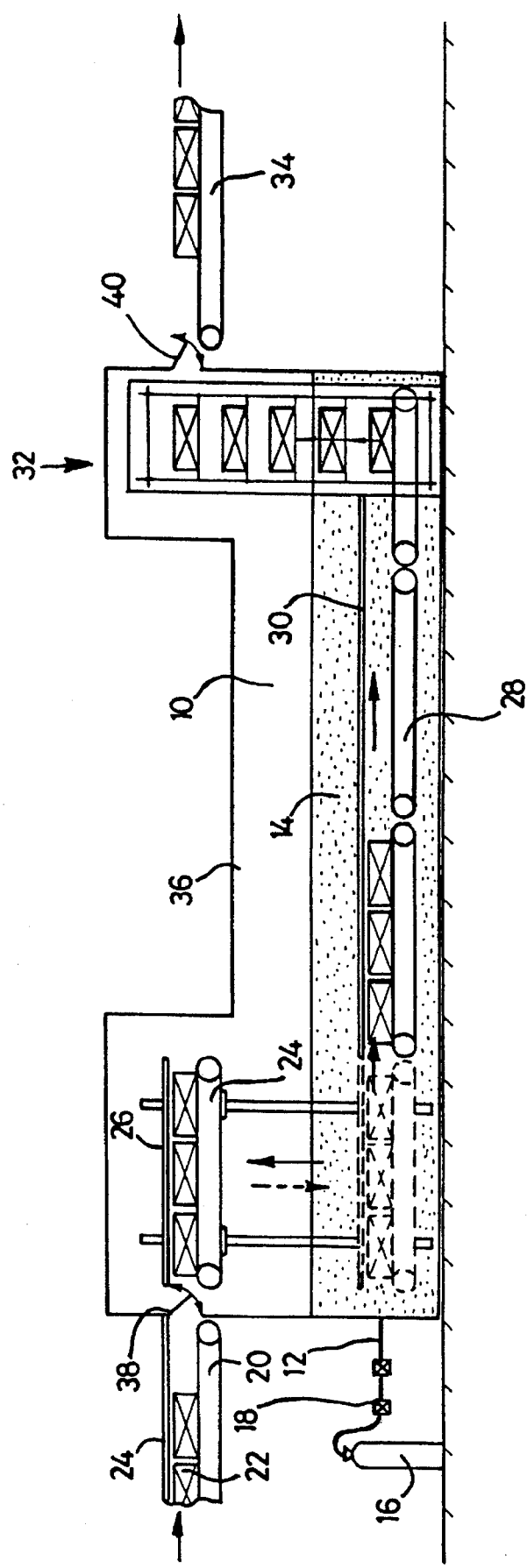
Figure 5:
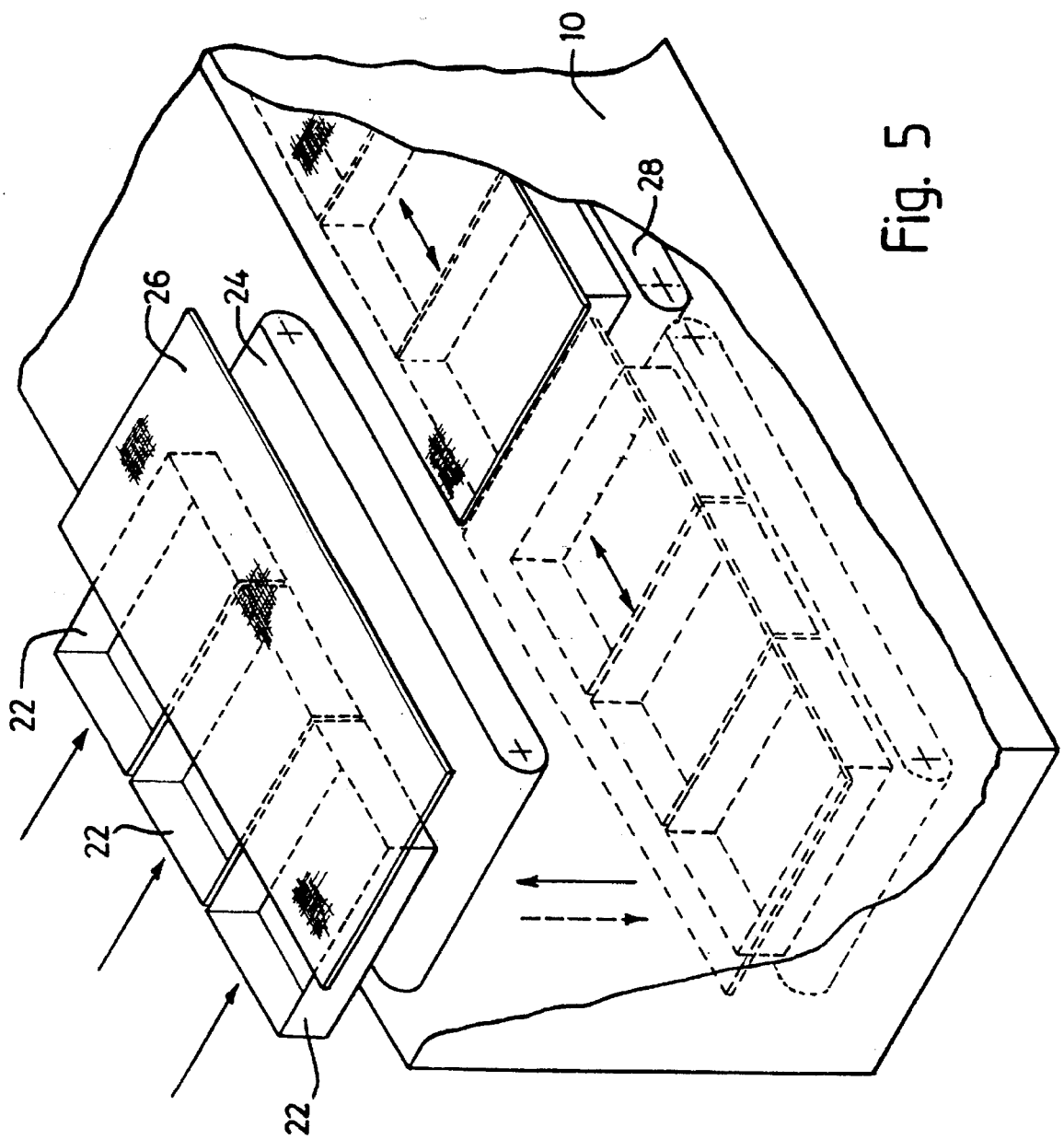

Preferred embodiments of the invention will now be described by way of example, with reference to the accompanying drawings, in which:

FIG. 1 is a diagrammatic side view of a first embodiment of apparatus according to the invention, FIG. 2 is a perspective view of a container in the form of an open-topped drawer used for accommodating poultry in the apparatus of FIG. 1, FIG. 3 is a diagrammatic side view of a modified form of the outfeed end of the apparatus of FIG. 1, FIG. 4 is a diagrammatic side view of a second embodiment of apparatus according to the invention, FIG. 5 is a perspective view of a modified way of accepting drawers into, or delivering drawers from, the apparatus of any of FIGS. 1, 3 or 4, and FIG. 6 is a diagrammatic side view of a third embodiment of apparatus according to the invention.

Referring to FIG. 1, the apparatus comprises a horizontally elongated rectangular open-topped tank 10 which is provided at one end with an inlet 12 and which defines a chamber accommodating a heavier than air gas 14 (or mixture of gases). The gas 14 is supplied from a source 16 through a valve 18 which is controlled so as to maintain the gas in the tank 10 within a predetermined range of levels.

At an infeed end of the tank, an in feed conveyor 20 delivers containers in the form of open-top drawers 22 (FIG. 2) containing live poultry which are prevented from escaping by means of a covering panel 21, in the manner disclosed in the applicants' European patent specification No 0061869. A representative drawer 22 is shown in FIG. 2. Each drawer 22 is moulded from a synthetic plastics material and has an apertured base and apertured side walls. The conveyor 20 presents the drawers 22 in a serial fashion, with the direction of elongation of each drawer 22 being perpendicular to the direction of movement of the conveyor 20, although the drawers 22 could be presented with their shorter dimension leading.

The conveyor 20 delivers the poultry-containing drawers 22 to lowering means comprising a generally horizontal platform 24 in the form of a conveyor dimensioned to accept three drawers 22 at a time. A cover 26 is positioned above the platform 24 at a spacing above the platform 24 sufficient for drawers to be accepted on the platform and effectively covered by the cover 26, to prevent the escape of poultry from the open-top drawers 22. The cover 26 is apertured, perforated or of mesh construction. The platform 24 and cover 26 are shiftable vertically on fixed guide posts 23 between a raised position shown in full lines and a lowered position shown in broken lines.

Having accepted a batch of three drawers, the platform 24 and cover 26 are together lowered into the infeed end of the tank 10. In the lowered position, the platform 24 is aligned with the input end of horizontally extending conveyor means 28 which are driven continuously. Energisation of the conveyor of the platform 24 then pushes the batch of three drawers 22 on to the first conveyor of the horizontally extending conveying means 28 which convey the open-topped drawers (and the poultry therein) along the base of the tank 10. A fixed cover 30 (which may also be apertured, perforated or of mesh construction to allow passage of gas) positioned above the conveying means 28 prevents the poultry escaping.

After removal of the batches of drawers from the platform 24, the platform 24 and cover 26 are raised to the upper position (shown in full lines in FIG. 1), ready to accept a fresh batch of three drawers 22. The intermittent drive to the conveyor 24, and the timed vertically reciprocating movement of the platform, may be provided by hydraulic, pneumatic or electric power.

At the outfeed end of the tank 10, the open-topped drawers 22 are delivered to lifting means 32 which lift the drawers, one at each level, to an upper position where a pusher delivers the drawers 22 to the infeed end of an outfeed conveyor 34. The lifting means comprise spaced chains, each driven in an endless loop in an indexed stepwise fashion, each drawer being engaged by projections on the chains which therefore lift the drawers from within the tank to the raised position at which the drawers are level with the outfeed conveyor 34. The drive of the lifting means 32 may be provided by hydraulic, pneumatic or electric power. The framework which supports the sprockets around which the chains pass is shown at 31 in FIG. 1.

In use, the tank 10 is filled to the required depth, such as one meter, with the gas. The open-topped drawers 22, each containing live poultry, are delivered onto the platform 24, the conveyor of the platform being energised until three drawers are received on the platform 24. The cover 26 prevents escape of poultry. As the platform 24 is lowered on the guide posts 23, the apertured construction of the drawers 22 and cover 26 facilitates entry of stunning gas and expulsion of air from the spaces within the drawers. As the drawers 22 are conveyed through the tank 10, the poultry are stunned, i.e., they rapidly lose consciousness and then die. The cover 30 ensures that no bird escapes from the drawers 22 during the gas stunning process. By the time the drawers reach the base of the lifting means 32, the poultry has been exposed to the gas for a time (e.g., two minutes) sufficient for all birds to be killed. Hence, downstream of the cover 30 it is not necessary to provide covers above the drawers because all the poultry is by this stage dead. During lifting in the lifting means 32, the apertured nature of the drawers facilitates "draining" of the stunning gas and hence reduces gas wastage.

The outfeed conveyor 34 transports the dead poultry to a hanging station at which operatives shackle the feet of each bird and hang each bird on a hook on a hanging line. The hanging line transports the birds to a slaughtering station. In contrast to conventional electrical stunning methods, the birds are dead when the operatives hang them on the hanging line. Hence the birds are limp and easily handled and the risk of carcass damage is greatly reduced compared with conventional electrical stunning methods.

FIG. 3 shows a modified lifting means 32 which raises a batch of three drawers at a time. The lifting means 32 has a platform which reciprocates between the lowered position (shown in broken lines) and the raised position shown in full lines. The lifting means 32 can therefore be regarded as similar to the lowering means, and indeed a cover is provided although this is not needed because the poultry in the drawers 22 are dead by this stage.

FIG. 4 shows apparatus which is similar to FIG. 1 (similar components bearing the same reference numerals), except that the tank 10 is provided with a top or cover 36 which helps to contain the gas and thereby reduces wastage and the consequent need to top up the gas level. Entry to the tank 10 at the infeed end is through an aperture closable by means of a pivotally mounted flap 38 which is biased by gravity to a closed position but which is deflected by advancing movement of the drawers to open to an extent sufficient to accept the poultry-containing drawers. At the outfeed end, the top or cover 36 has a similar outlet aperture closable by a pivoted flap 40 biased by gravity to a closed position.

FIGS. 1, 3 and 4 show arrangements in which the drawers 22 are delivered to the tank, and removed from the tank, in a direction generally parallel with the direction of movement of the drawers through the tank. There may be situations in which it is more convenient to move the poultry-containing drawers 22 onto the platform 24 in a direction transverse to the direction of movement of the drawers through the tank, i.e., to load the drawers onto the platform 24 from one or other side of the apparatus. Similarly it may in certain circumstances be more convenient to deliver the drawers from the lifting means to one or other side of the apparatus. FIG. 5 illustrates a modified form of lowering means, or lifting means, to achieve this.

When the construction of FIG. 5 is used as a lowering means, a batch of three drawers 22 is delivered from one side of the apparatus to a position on the platform 24 beneath the cover 26. The platform 24 and cover 26 then descend to the lowered position, shown in broken lines, as previously described.

When the construction of FIG. 5 is used as the lifting means, three drawers are lifted at a time, as in FIG. 3, and the batch of three drawers are pushed sideways onto the infeed end of the outfeed conveyor 34 which then transports the drawers in a horizontal direction perpendicular to the general horizontal direction of movement of the drawers through the apparatus.

The described appartus has the capacity to stun chickens in a continuous process at a rate of two thousand to twelve thousand birds per hour.

Figure 6:
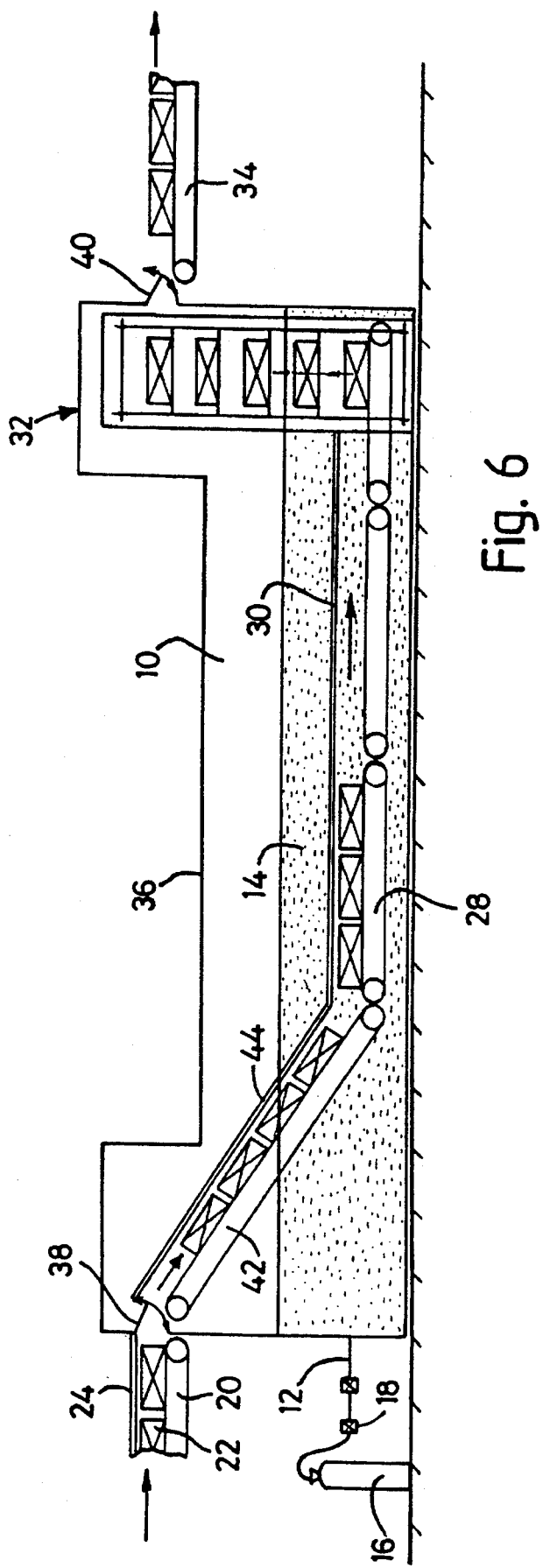

The apparatus shown in FIG. 6 can be regarded as a modification of the apparatus of FIG. 4, and corresponding components in the two Figures bear the same reference numerals. FIG. 6 differs from FIG. 4 in that the lowering means comprises an inclined conveyor 42 which, at its upper end, receives poultry-containing open-topped drawers 22 ted by the infeed conveyor 20 through the flap 38. An upwardly inclined conveyor, like conveyor 42, could be used to raise the drawers out of the tank, in place of the vertically shiftable lifting means 32 of any embodiment.

The inclined conveyor 42 runs continuously and conveys the drawers 22 in serial fashion in a downwardly inclined path to the infeed end of the conveying means 28. An inclined fixed cover 44 positioned above the conveyor 42 prevents the poultry escaping from the drawers 22 during the descent into the chamber 10. The inclined conveyor 42 provides a more gradual descent into the gas and the combined effect of the horizontal and vertical components of movement may provide better penetration of the stunning gas into the drawers 22.

It will be appreciated that the inclined conveyor 42 and cover 44 may be provided in the apparatus of FIG. 1, instead of the platform 24- and cover 26.

If required, the conveyor 20 could be positioned to the right-hand side of the lowering means as viewed in FIGS. 1, 4 and 6, the conveyor 20 then delivering the drawers to the lifting means in a leftwards movement. Similarly, the conveyor 34- could be positioned on the left-hand side of the lifting means, the conveyor 34- then transporting the drawers away from the top of the lifting means in a rightwards movement.

We claim:

1. Apparatus for gas stunning of poultry, the apparatus comprising:
   a plurality of containers each in the form of an open-topped rectangular drawer which is moulded from a synthetic plastics material with apertures to allow the passage of stunning gas into the containers,
   a chamber accommodating a heavier than air gas or gases effective to stun the poultry,
   an infeed conveyor for delivering a series of said containers, each containing poultry, to an inlet end of the chamber,
   a covering panel spaced above the infeed conveyor by a distance which allows the passage of the containers on the infeed conveyor and which covers the tops of the containers in a manner to prevent the poultry in the containers escaping therefrom,
   lowering means for accepting the containers delivered by the infeed conveyor and for lowering the containers into the chamber, the lowering means including a cover which is positioned so as to cover the open tops of the containers while on the lowering means and thereby prevent poultry escaping from the containers while on the lowering means,
   conveyor means within the chamber for accepting the containers from the lowering means and for transporting the containers through the chamber,
   covering means above the conveying means, the covering means being spaced above the conveying means by a distance which allows the passage of the containers on the conveyor means and which covers the tops of the containers to prevent the poultry in the containers escaping therefrom, the covering means being of apertured construction to permit the passage of gas therethrough, so that the gas enters the containers and air leaves the containers through the apertures in the containers and through the covering means,
   lifting means for receiving the containers at an outfeed end of the conveyor means and lifting the containers out of the chamber,
   and an outfeed conveyor for accepting containers with stunned poultry and for transporting the containers with stunned poultry away from the chamber.

2. Apparatus according to claim 1, wherein the lowering means comprise a generally horizontal platform which receives containers from an infeed conveyor, lowers them into the chamber and then delivers them to the infeed end of the conveying means in the chamber before the platform, now empty, is raised to receive the next batch of poultry-containing containers.

3. Apparatus according to claim 2, wherein the platform is in the form of a conveyor.

4. Apparatus according to claim 2, wherein the platform of the lowering means accommodates a plurality of open top containers, so that each descent of the platform lowers this plurality of containers into the chamber.

5. Apparatus according to claim 1, wherein the lifting means comprise a generally horizontal platform in the form of a conveyor which reciprocates up and down, moving up to lift the poultry-containing containers to the infeed end of an outfeed conveyor and moving down when in an unloaded state to collect the next batch of poultry-containing containers.

6. Apparatus according to claim 5, wherein the platform of the lifting means accommodates a plurality of containers.

7. Apparatus according to claim 5, wherein the lifting means comprise endless chains which are driven in continuous loops so that projections carried by the chains engage the containers and lift the containers to the level of the outfeed conveyor, a pusher mechanism pushing the raised containers from the lifting means onto the outfeed conveyor.

8. Apparatus according to claim 1, wherein the stunning gas is a mixture of gases, e.g., argon and carbon dioxide.

* * * * *